Sept. 25, 1934.    J. B. WINFREE, JR    1,975,032
CARRIAGE FOR CAKE CUTTING MACHINES
Filed April 17, 1931    2 Sheets-Sheet 1

Inventor,
John B. Winfree, Jr.,
By Emil Bönnelycke
Attorney

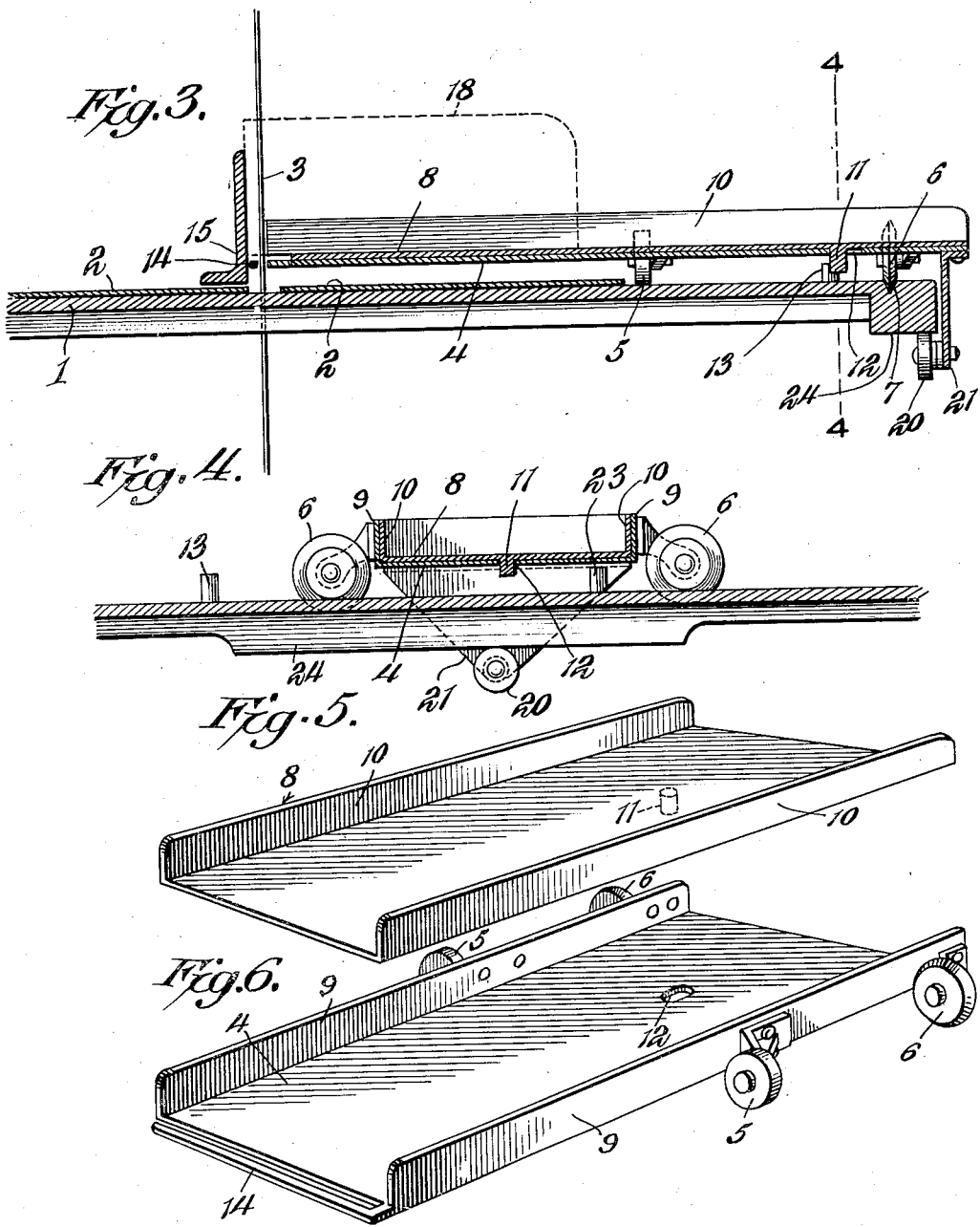

Patented Sept. 25, 1934

1,975,032

UNITED STATES PATENT OFFICE 1,975,032

CARRIAGE FOR CAKE CUTTING MACHINES

John Bell Winfree, Jr., Lynchburg, Va.

Application April 17, 1931, Serial No. 530,993

10 Claims. (Cl. 146—88)

The present invention relates to a carriage which is particularly adapted to be utilized as an attachment for a cake-cutting machine of the type shown in my copending application Serial No. 456,752, filed May 28, 1930 and which became Patent No. 1,916,596 on July 4, 1933.

It is an object of the present invention to provide a carriage which is adapted to hold cake or any similar product or material, as bread, for instance, which is to be sliced. The present invention also contemplates a construction in which a pair of trays is provided, one slidably mounted in the other and adapted to be moved away from the cutter of the machine on the return or non-cutting stroke of the trays.

A further object of the invention resides in the fact that the carriage is provided with means to limit the travel of the carriage, at the same time acting to move the cake away from the blade on the return stroke and to again move the cake back into position when the end of the return stroke is reached.

Figure 1:
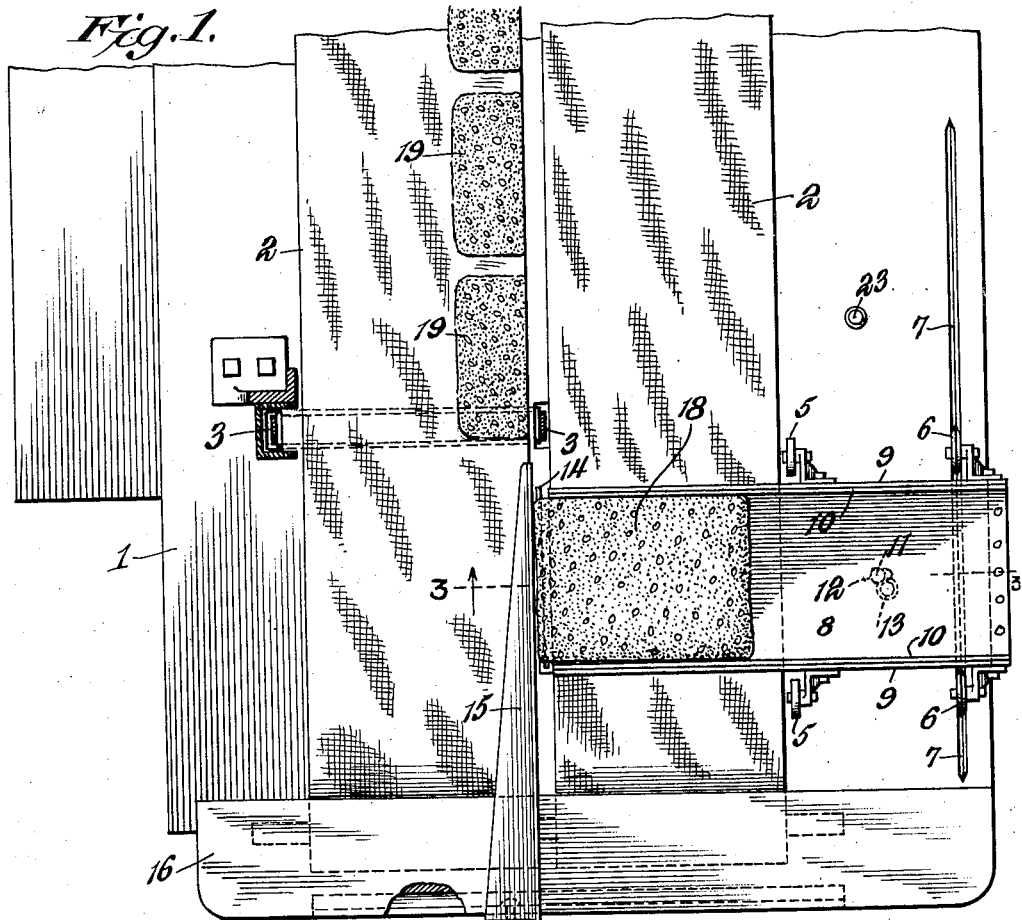
Figure 2:
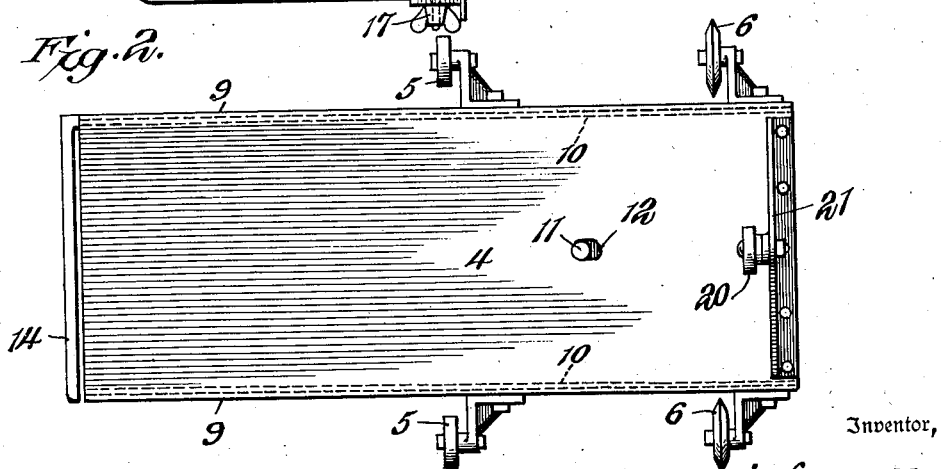

Other objects will be apparent from the following description taken in connection with the accompanying drawings, in which:

Figure 1 is a top view of the table of the cake-cutting machine with the carriage provided thereon, Fig. 2 is a bottom view of the carriage, Fig. 3 is a sectional view of the cake-cutting table and the carriage taken on line 3—3 of Fig. 1, Fig. 4 is a further section through the table and carriage taken on line 4—4 of Fig. 3, Fig. 5 is a perspective view showing the inner tray of the cake carriage, and Fig. 6 is a perspective view showing the bottom tray or base of the carriage.

Such parts of the cake-cutting machine as the table 1, the belts 2 and the band knife 3 are clearly and completely described in applicant's co-pending application referred to in the foregoing; therefore, no additional or further description is necessary. The cake carriage itself consists of a bottom tray or base 4 which is provided with a pair of wheels or rollers 5, one thereof being mounted on each side. The bottom tray is also provided with a pair of guide rollers 6 having a periphery which is V-shaped and adapted to roll in a correspondingly shaped track 7 cut in the table 1. The pair of rollers 5 merely roll on the flat surface of the table, but the rollers 6 act as guides for the carriage.

To prevent any possible tipping of the carriage toward the knife band, the bottom tray is provided with a retaining roller 20 mounted on a support 21 secured to the underside of the bottom tray 4. This retaining roller contacts with a track 24 on the underside of the table 1 and thereby provides a steady and rigid carriage operation which, of course, adds to the accuracy of the cut slices of cake. The outer bottom edge of the underside of the table 1 is suitably provided with the track portion 24, against which the roller 20 presses throughout the operating movement of the carriage, that is, between the abutments 13 and 23. The track 24 ends or becomes thinner approximately below stop 13, and also approximately between stop 23 and its end of track 7. It is thus a simple matter to remove the entire carriage assembly from the cutting machine by first taking out or shifting the inner tray 8 and with it the stop pin 11, so that the carriage can be moved beyond its normal limit, bringing the roller 20 beyond the end of track 24. The carriage can then be raised until the guiding rolls 6 are out of the groove 7 and the whole device is free to be withdrawn.

The cake carriage is provided with an inner tray 8, which is constructed similarly to the bottom tray 4, that is, the bottom tray is provided with a pair of longitudinal sides 9 and the inner tray is provided with similar sides 10. The ends of both trays are open, as clearly shown in Figs. 5 and 6 of the drawings. The inner tray may be suitably constructed of sheet metal from aluminum or any other suitable material and the bottom tray may be suitably manufactured as a cast element, which can likewise be made of aluminum, so that the carriage may be easily handled and operated.

The inner tray 8 is provided on its under surface and near one end with a depending pin 11 projecting through an elongated slot or perforation 12 in the bottom tray and this pin projects a certain distance below the bottom surface of the bottom tray, as clearly shown in Figs. 3 and 4. The pin may termed an actuating pin since, as will be described in the following, it serves to actuate and slide the inner tray 8 back and forth in the bottom tray for the purpose which will be set forth. The pin 11 is adapted to cooperate with a pair of spaced pins or abutments 13 and 23 which are securely mounted or provided on the table of the machine. These abutments are secured a certain distance from one another which is somewhat greater than the width of the cake carriage and, as shown in Fig. 1, the abutments are somewhat out of alignment, considering the direction of movement of the carriage. The extent to which the abutments are out of alignment can, of course, be varied depending upon the extent of movement required or desired of the inner tray.

The inner end of the carriage is provided with a guide or supporting strip 14 mounted on or suitably secured to the bottom tray and adapted to act as a support for the end of the cake and as a guide for the band knife 3 of the machine. In other words, the band knife 3, during the travel of the carriage, passes between the guide 14 and the inner edge of the trays. The cake-cutting machine is further furnished with a stationary guide member 15 which is adjustably mounted on the edge of the table extension 16. This guide 15 may be adjusted laterally by means of a wing nut 17, which nut also secures the guide in adjusted position. The guide 15 acts to control the thickness of the slice to be cut in that, as shown in Fig. 1, the cake 18 is manually forced against the guide before running the carriage forward and the cake into the band knife. The cake carriage operates and is adapted to be operated as follows:—

The cake 18, Fig. 1, is placed in the inner tray against the forward side 10 and is manually pushed towards the left against the guide 15. The carriage itself is, of course, in its extreme forward position, in which the pin 11 contacts against abutment 13 and, due its its contact therewith, the inner tray is pushed to its extreme left position relative to the slot 12 in the bottom tray. The carriage is, in this position, manually moved toward the knife band and the slice of cake 19 is cut therefrom and falls on the belt 2 to be conveyed to any desired location for wrapping and packing. Just at the point where the knife band completely cuts the slice, the pin 11 strikes against the rear abutment 23, which results in the inner tray 8 and the cake 18 being moved to the right, relative to the bottom tray, to the extent of travel of the pin or projection 11 in the slot 12. In this way, the cut surface of the cake is moved a trifle to the right so that on the return stroke of the carriage the cake will not touch the knife band and thereby the cut surface will not be marred or exposed to possible damage. When the carriage reaches the end of the return stroke, the pin 11 hits abutment 13, shifting or forcing the inner tray 8 together with the cake 18 back to its normal position. Thereafter the cake 18 is manually moved against the guide 15 and the cycle of operation is repeated. As clearly seen in Fig. 1, the pins or projections 13 and 23 on the table 1 are mounted in a so-called staggered relation. In other words, one pin is not behind the other and, as a matter of fact, their apparent offset mounting is approximately equivalent to the length of the slot 12, the latter being any desired length depending upon the extent of travel which it is desired to impart to the inner tray. In machines of this character, it is, of course, advisable to have each cut surface of the slice of cake present a perfect appearance and it is quite possible for a cut surface to accidentally become marred on the return stroke, which might happen if the knife band is not running true or for any other reason the cake is not moved a slight distance from the band. The carriage can be operated very rapidly and it is obvious that the speed with which the tray is used is entirely dependent upon the operator handling the machine.

I claim as my invention:—

1. A slicing carriage for cake-cutting machines, comprising a bottom tray having a slot therein; an inner tray slidably mounted in the bottom tray and having a pin projecting through the bottom tray; and means on the cutting machine cooperating with the pin forming end stops to limit the extent of travel of the carriage and to shift the inner tray away from and toward the cutter of the machine at the stop limits of the carriage.

2. A slicing carriage for cake-cutting machines, comprising a bottom tray adapted to be reciprocated past a cutter of the machine; an inner tray slidably mounted in the bottom tray and adapted to receive the cake to be cut; a pin projecting from the inner tray; and a pair of spaced abutments mounted on the machine, said pin shifting the inner tray away from the cutter by striking one of the abutments before starting the return or non-cutting stroke of the carriage and toward the cutter by striking the other abutment before starting the forward or cutting stroke.

3. A slicing carriage for the table of cake-cutting machines, comprising a bottom tray having a perforation therein and adapted to be reciprocated on the table past a cutter of the machine; an inner tray slidably mounted in the bottom tray and being adapted to receive the cake to be cut; a pin on the inner tray and projecting through the perforation in the bottom tray; and means on the table to shift the inner tray by means of the pin away from the cutter before starting the return or non-cutting stroke of the carriage and toward the cutter before starting the forward or cutting stroke.

4. A slicing carriage for the table of cake-cutting machines, comprising a bottom tray having a perforation therein and adapted to be reciprocated on the table past a cutter of the machine; an inner tray slidably mounted in the bottom tray and being adapted to receive the cake to be cut; a pin on the inner tray projecting through the perforation in the bottom tray; and a pair of spaced abutments mounted on the table, said pin shifting the inner tray away from the cutter by striking one of the abutments before starting the return or non-cutting stroke of the carriage and toward the cutter before striking the other abutment by starting the forward or cutting stroke.

5. A slicing carriage for the table of cake-cutting machines, comprising a bottom tray having a perforation therein; a plurality of rollers mounted on the bottom tray adapted to roll on the table whereby the tray is reciprocated past a cutter of the machine; an inner tray slidably mounted in the bottom tray and being adapted to receive the cake to be cut; a pin on the inner tray projecting through the perforation in the bottom tray; and a pair of spaced abutments mounted on the table, said pin shifting the inner tray away from the cutter when striking one of the abutments before starting the return or non-cutting stroke of the carriage and toward the cutter when striking the other abutment before starting the forward or cutting stroke.

6. A slicing carriage for the table of cake-cutting machines, comprising a bottom tray having a perforation therein; a plurality of rollers mounted on the bottom tray adapted to roll on the table whereby the tray is reciprocated past a cutter of the machine; an inner tray slidably mounted in the bottom tray and being adapted to receive the cake to be cut; a pin on the inner tray projecting through the perforation in the bottom tray; a pair of spaced abutments mounted on the table, said pin shifting the inner tray away from the cutter when striking one of the abutments before starting the return or non-cutting stroke of the carriage and toward the cutter when striking the other abutment before starting the forward or cutting stroke; and a retaining roller mounted on the bottom tray to contact with the table to retain the carriage in place.

7. A slicing carriage for the table of cake-cutting machines, comprising a bottom tray having a perforation therein; a plurality of rollers mounted on the bottom tray adapted to roll on the table whereby the tray is reciprocated past a cutter of the machine; an inner tray slidably mounted in the bottom tray and being adapted to receive the cake to be cut; a pin on the inner tray projecting through the perforation in the bottom tray; a pair of spaced abutments mounted on the table, said pin shifting the inner tray away from the cutter when striking one of the abutments before starting the return or non-cutting stroke of the carriage and toward the cutter when striking the other abutment before starting the forward or cutting stroke; and a guide member mounted on the bottom tray adapted to act as a guide for the cutter of the machine.

8. A slicing carriage for the table of cake-cutting machines, comprising a tray to reciprocate on the table in a direction parallel to the cutting plane of a cutter of the machine; a pair of portions projecting from the top of the table and mounted in spaced relation out of alignment with respect to the direction of movement of the reciprocating tray; an actuating portion secured to and protruding from the bottom of the tray to cooperate and contact with the projecting portions on the table to shift the tray at right angles relative to the cutter when the actuating portion contacts and strikes one of the projecting portions on the table, the non-alignment of the projecting portions governing the direction of movement of the tray away from or toward the cutter; and means coacting with the actuating portion and the pair of projecting portions to provide end stops for the first-mentioned reciprocating motion of the tray.

9. A slicing carriage according to claim 8, in which the projecting and actuating portions are in the form of pins.

10. A slicing carriage according to claim 8, in which the tray consists of a bottom part and an inner part sliding in the bottom part, and in which the means constitutes the walls of a slot in the bottom part through which the actuating portion projects which is secured to the inner part, and said slot limiting the movement of the inner tray away from or toward the cutter.

JOHN BELL WINFREE, Jr.